United States Patent
Ozaki et al.

(10) Patent No.: US 9,711,803 B2
(45) Date of Patent: *Jul. 18, 2017

(54) CARBON CATALYST, METHOD FOR MANUFACTURING THE CARBON CATALYST, AND ELECTRODE AND BATTERY USING THE CARBON CATALYST

(75) Inventors: Jun-ichi Ozaki, Kiryu (JP); Takeaki Kishimoto, Funubashi (JP)

(73) Assignee: NISSHINBO HOLDINGS INC., Tokyo (JP)

(*) Notice: Subject to any disclaimer, the term of this patent is extended or adjusted under 35 U.S.C. 154(b) by 818 days.

This patent is subject to a terminal disclaimer.

(21) Appl. No.: 13/131,928

(22) PCT Filed: Nov. 24, 2009

(86) PCT No.: PCT/JP2009/069778
§ 371 (c)(1),
(2), (4) Date: May 31, 2011

(87) PCT Pub. No.: WO2010/064556
PCT Pub. Date: Jun. 10, 2010

(65) Prior Publication Data
US 2011/0229766 A1   Sep. 22, 2011

(30) Foreign Application Priority Data
Dec. 2, 2008 (JP) ................................ 2008-307848

(51) Int. Cl.
*H01M 4/96* (2006.01)
*C01B 31/02* (2006.01)
(Continued)

(52) U.S. Cl.
CPC .............. *H01M 4/96* (2013.01); *C01B 31/02* (2013.01); *H01M 4/86* (2013.01); *H01M 2008/1095* (2013.01)

(58) Field of Classification Search
CPC ................................................. H01M 8/0234
(Continued)

(56) References Cited

U.S. PATENT DOCUMENTS 4,756,898 A    7/1988 Hopper et al.
4,806,290 A    2/1989 Hopper et al.
(Continued)

FOREIGN PATENT DOCUMENTS

CA    2642226 A1    8/2007
EP    1 854 539 A1    11/2007
(Continued)

OTHER PUBLICATIONS

Kobayashi et al., "Influences of Surface State of Carbon Substrates on the Catalytic Activity of Carbon Catalyst for ORR Prepared by Poly-Vinylpyridine Metal Complexes for Oxygen Reduction Reaction (ORR)." *The Carbon Society of Japan*, 2008, vol. 35, p. 124-125.

(Continued)

*Primary Examiner* — Scott J Chmielecki
(74) *Attorney, Agent, or Firm* — Oliff PLC

(57) ABSTRACT

Provided are a carbon catalyst having an excellent activity and a method of manufacturing a carbon catalyst, and an electrode and a battery each using the carbon catalyst. The method of manufacturing a carbon catalyst according to the present invention includes a carbonizing step S2, the step involving heating a raw material containing a thermoplastic resin, a metal, and a conductive carbon material to coat the surface of the conductive carbon material with the molten thermoplastic resin and to carbonize the thermoplastic resin on the surface of the conductive carbon material so that the carbon catalyst is obtained.

20 Claims, 9 Drawing Sheets

(51) Int. Cl.
*H01M 4/86* (2006.01)
*H01M 8/1018* (2016.01)

(58) Field of Classification Search
USPC .......................................................... 429/523
See application file for complete search history.

(56) References Cited

U.S. PATENT DOCUMENTS

| | | | |
|---|---|---|---|
| 5,888,430 | A | 3/1999 | Wakayama et al. |
| 5,919,429 | A | 7/1999 | Tanaka et al. |
| 6,509,119 | B1 | 1/2003 | Kobayashi et al. |
| 7,320,842 | B2 | 1/2008 | Ozaki et al. |
| 7,585,585 | B2 | 9/2009 | Ozaki et al. |
| 7,887,771 | B2 | 2/2011 | Sun et al. |
| 9,059,471 | B2 | 6/2015 | Ozaki et al. |
| 2003/0175580 | A1 | 9/2003 | Ozaki et al. |
| 2005/0037255 | A1 | 2/2005 | Ozaki et al. |
| 2005/0158550 | A1* | 7/2005 | Ohta ............... H01M 4/587 428/407 |
| 2008/0027149 | A1* | 1/2008 | Aikyou ............. C01B 31/02 516/32 |
| 2009/0130502 | A1* | 5/2009 | Liu .................. H01M 4/9008 429/483 |

FOREIGN PATENT DOCUMENTS

| | | | | |
|---|---|---|---|---|
| EP | 2 371 448 | A1 | 10/2011 | |
| JP | A-2007-018801 | | 1/2007 | |
| JP | A-2007-026746 | | 2/2007 | |
| JP | 2007207662 | * | 8/2007 | ............. H01M 4/96 |
| JP | 2007207662 | A * | 8/2007 | |
| JP | A-2007-207662 | | 8/2007 | |
| JP | A-2008-282725 | | 11/2008 | |
| WO | 2007044614 | A2 | 4/2007 | |
| WO | 2008/091002 | A1 | 7/2008 | |

OTHER PUBLICATIONS

International Search Report issued in International Application No. PCT/JP2009/069778 dated Feb. 16, 2010 (with translation).
International Preliminary Report on Patentability issued in International Application No. PCT/JP2009/069778 dated Feb. 28, 2011 (with translation).
Jun. 13, 2016 Office Action issued in U.S. Appl. No. 14/706,592.
Sep. 26, 2014 Office Action issued in U.S. Appl. No. 13/131,997.
May 13, 2014 Office Action issued in U.S. Appl. No. 13/131,997.
Jan. 8, 2014 Office Action issued in U.S. Appl. No. 13/131,997.
Jun. 28, 2013 Office Action issued in U.S. Appl. No. 13/131,997.
U.S. Appl. No. 14/706,592 to Ozaki et al., filed May 7, 2015.

* cited by examiner

FIG.2
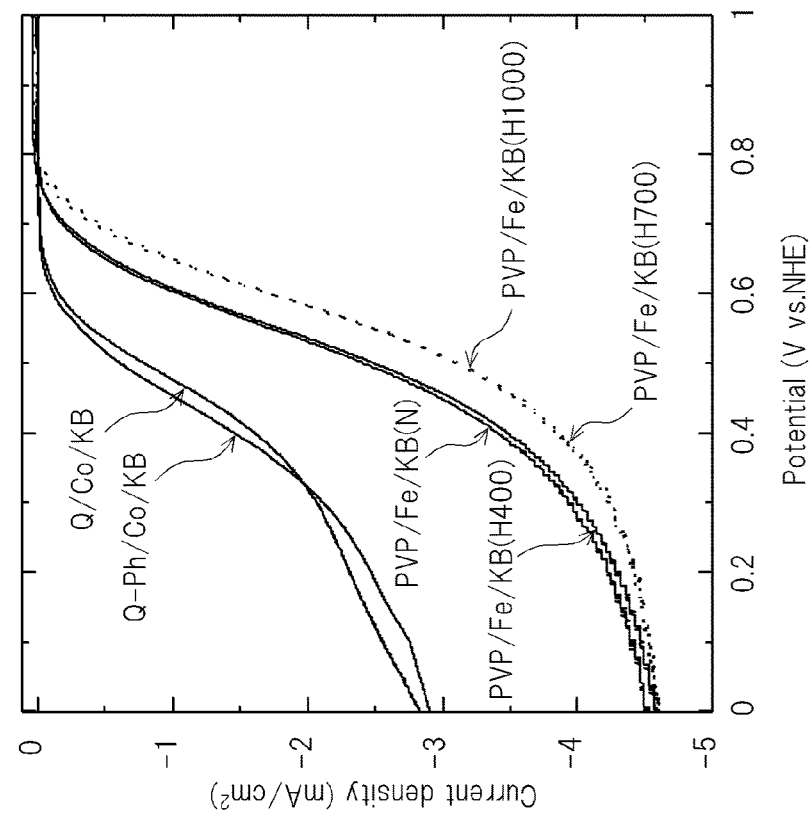
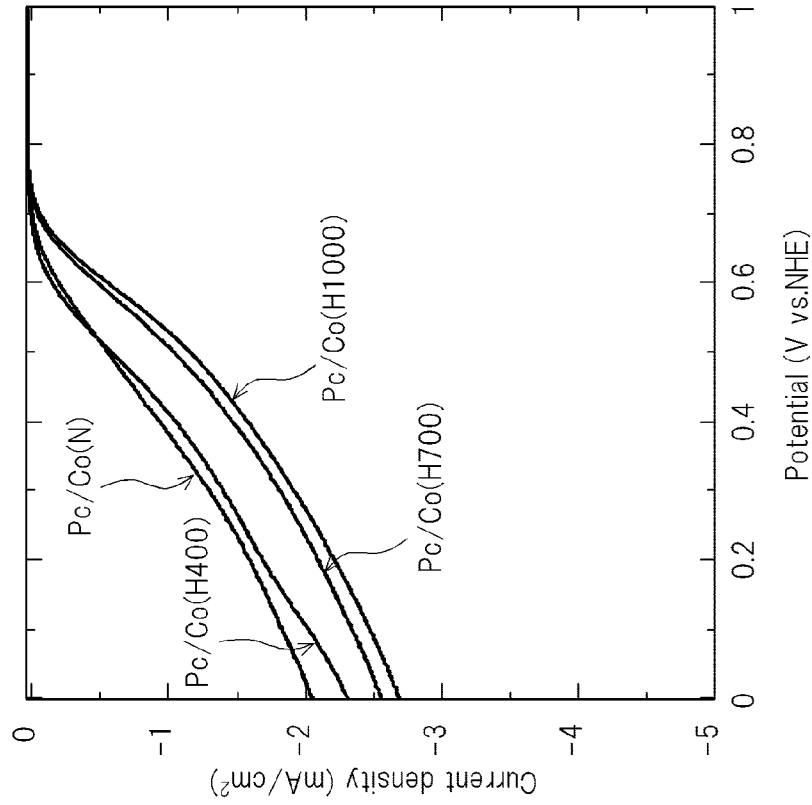

FIG.3

| CARBON CATALYST | CURRENT DENSITY (mA/cm$^2$) | OXYGEN REDUCTION-STARTING POTENTIAL (V) | NUMBER OF ELECTRONS INVOLVED IN REACTION |
|---|---|---|---|
| Pc/Co(N) | -0.0015 | 0.731 | 3.4 |
| Pc/Co(H400) | -0.0073 | 0.756 | 3.5 |
| Pc/Co(H700) | -0.0442 | 0.756 | 3.5 |
| Pc/Co(H1000) | -0.0625 | 0.763 | 3.5 |
| Q/Co/KB(N) | -0.0125 | 0.727 | 3.5 |
| Q-Ph/Co/KB | -0.0117 | 0.705 | 2.6 |
| PVP/Fe/KB(N) | -0.1814 | 0.775 | 3.9 |
| PVP/Fe/KB(H400) | -0.2075 | 0.765 | 3.9 |
| PVP/Fe/KB(H700) | -0.4678 | 0.795 | 3.9 |
| PVP/Fe/KB(H1000) | -0.4183 | 0.784 | 3.9 |
| PVP/Co/KB | -0.1230 | 0.784 | 3.8 |

FIG.4

| CARBON CATALYST | OXYGEN REDUCTION-STARTING POTENTIAL (V) | | NUMBER OF ELECTRONS INVOLVED IN REACTION | |
|---|---|---|---|---|
| | BEFORE HEAT TREATMENT | AFTER HEAT TREATMENT | BEFORE HEAT TREATMENT | AFTER HEAT TREATMENT |
| PVP/Fe/KB(C700) | 0.77 | 0.81 | 3.8 | 3.8 |
| PVP/Fe/KB(C800) | 0.79 | 0.81 | 3.8 | 3.8 |
| PVP/Fe/KB(C900) | 0.78 | 0.82 | 3.9 | 3.9 |
| PVP/Fe/KB(C1000) | 0.79 | 0.83 | 3.9 | 3.9 |

FIG.5

| CARBON CATALYST | CURRENT DENSITY (mA/cm$^2$) | OXYGEN REDUCTION-STARTING POTENTIAL (V) |
|---|---|---|
| Pc/Co(C800) | -0.0012 | 0.77 |
| Pc/Co(C1000) | -0.0015 | 0.75 |
| Pc/Fe(C800) | -0.0047 | 0.76 |

FIG. 8
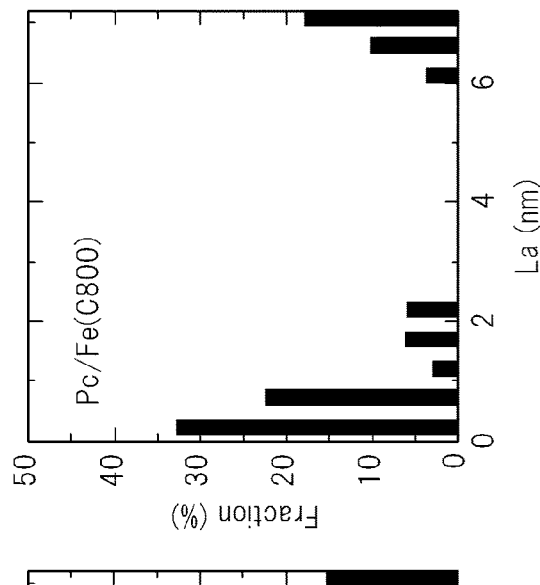
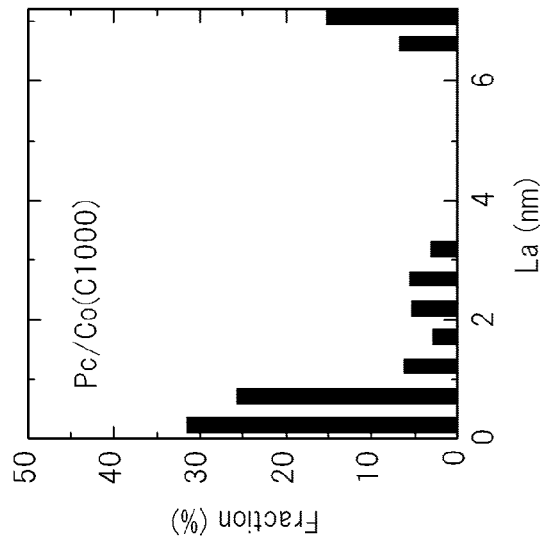
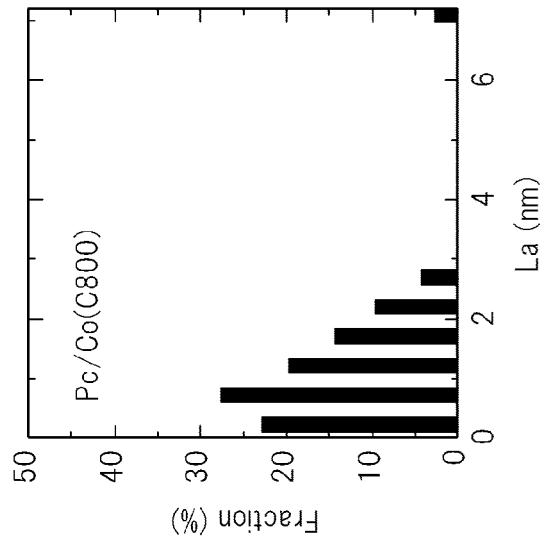

FIG.9

| CONDITION | SAMPLE | RATIO(%) | | | | | | | |
|---|---|---|---|---|---|---|---|---|---|
| | | 1~5nm | LESS THAN 1nm | 2~5nm | LESS THAN 2nm | 3~5nm | LESS THAN 3nm | MORE THAN 5nm |
| PVP/Fe/KB (NO HEAT TREATMENT) | PVP/Fe/KB(C500-N) | 83 | 17 | 64 | 36 | 30 | 70 | 0 |
| | PVP/Fe/KB(C600-N) | 100 | 0 | 82 | 18 | 39 | 61 | 0 |
| | PVP/Fe/KB(C700-N) | 68 | 0 | 30 | 38 | 0 | 68 | 1 |
| | PVP/Fe/KB(C800-N) | 100 | 0 | 49 | 51 | 0 | 100 | 0 |
| | PVP/Fe/KB(C900-N) | 100 | 0 | 75 | 25 | 48 | 52 | 0 |
| | PVP/Fe/KB(C1000-N) | 100 | 0 | 78 | 22 | 19 | 81 | 0 |
| PVP/Fe/KB (AFTER HEAT TREATMENT) | PVP/Fe/KB(C700-H700) | 84 | 0 | 84 | 0 | 75 | 9 | 16 |
| | PVP/Fe/KB(C800-H700) | 100 | 0 | 100 | 0 | 81 | 19 | 0 |
| | PVP/Fe/KB(C900-H700) | 87 | 0 | 87 | 0 | 77 | 10 | 13 |
| | PVP/Fe/KB(C1000-H700) | 100 | 0 | 100 | 0 | 81 | 19 | 0 |
| Pc/Co | Pc/Co(C800) | 47 | 50 | 14 | 84 | 0 | 98 | 0 |
| | Pc/Co(C1000) | 22 | 57 | 13 | 65 | 3 | 76 | 22 |
| Pc/Fe | Pc/Fe(C800) | 14 | 55 | 6 | 63 | 0 | 69 | 31 |
| KB | KB | 35 | 0 | 35 | 0 | 24 | 11 | 65 |

CARBON CATALYST, METHOD FOR MANUFACTURING THE CARBON CATALYST, AND ELECTRODE AND BATTERY USING THE CARBON CATALYST

TECHNICAL FIELD

The present invention relates to a carbon catalyst and a method of manufacturing the carbon catalyst, and an electrode and a battery each using the carbon catalyst, in particular, a carbon catalyst that can replace a precious metal catalyst such as platinum or palladium.

BACKGROUND ART

A polymer electrolyte fuel cell (PEFC) can operate in a low-temperature region and has high energy conversion efficiency, and a time period required for its startup is short. In addition, the system of the PEFC can be made small and lightweight. Accordingly, the PEFC has been expected to find applications in power sources for electric vehicles, portable power sources, and household co-generation systems.

However, large amounts of platinum catalysts are used in the PEFC. The use of the platinum catalysts causes an increase in cost, which is one factor that may inhibit the widespread use of the PEFC. In addition, a concern has been raised in that restriction is imposed on the PEFC in terms of platinum reserves.

In view of the foregoing, the development of a novel catalyst that can replace the platinum catalyst has been advanced. That is, for example, a carbon catalyst obtained by imparting a catalytic activity to a carbon material itself has been proposed (see, for example, JP 2007-026746 A, JP 2007-207662 A and JP 2008-282725 A).

PRIOR ART DOCUMENT

Patent Document

Patent Document 1: JP 2007-026746 A
Patent Document 2: JP 2007-207662 A
Patent Document 3: JP 2008-282725 A

SUMMARY OF THE INVENTION

Problems to be Solved by the Invention

However, no catalyst having a high activity sufficient to replace the platinum catalyst in the PEFC has been put into practical use yet.

The present invention has been made in view of the above-mentioned problems, and an object of the present invention is to provide a carbon catalyst having an excellent activity and a method of manufacturing the carbon catalyst, and an electrode and a battery each using the carbon catalyst.

Means for Solving the Problems

A carbon catalyst according to one embodiment of the present invention for solving the above-mentioned problems is characterized by including: a conductive carbon material; and a carbon structure coating the surface of the conductive carbon material. According to the present invention, there can be provided a carbon catalyst having an excellent activity.

In addition, the carbon structure may be formed of a carbon network plane in which a ratio of crystallite sizes of 1 to 5 nm in a distribution of crystallite sizes La of 7.2 nm or less is 50% or more. Further, a ratio of crystallite sizes of less than 1 nm in the distribution of the crystallite sizes La may be 40% or less. Further, the carbon structure may include a carbon structure formed by heating a raw material containing a thermoplastic resin, a metal, and the conductive carbon material to carbonize the raw material. Thus, a carbon catalyst having an excellent activity can be more reliably provided.

An electrode according to one embodiment of the present invention for solving the above-mentioned problems is characterized by carrying any one of the above-mentioned carbon catalysts. According to the present invention, there can be provided an excellent electrode carrying a carbon catalyst having an excellent activity.

A battery according to one embodiment of the present invention for solving the above-mentioned problems is characterized by including the above-mentioned electrode. According to the present invention, there can be provided an excellent battery including an electrode carrying a carbon catalyst having an excellent activity.

A method of manufacturing a carbon catalyst according to one embodiment of the present invention for solving the above-mentioned problems is characterized by including the step of heating a raw material containing a thermoplastic resin, a metal, and a conductive carbon material to coat the surface of the conductive carbon material with the molten thermoplastic resin and to carbonize the thermoplastic resin on the surface of the conductive carbon material so that the carbon catalyst is obtained. According to the present invention, there can be provided a method of manufacturing a carbon catalyst having an excellent activity.

Further, the thermoplastic resin may include a polymer ligand capable of coordinating to the metal, and the raw material may contain a complex formed as a result of coordination of the thermoplastic resin to the metal. Thus, the metal can be effectively dispersed onto the surface of the conductive carbon material. Further, in this case, the thermoplastic resin may contain one or more nitrogen atoms as ligand atoms in a molecule thereof. Thus, the metal and nitrogen can be effectively dispersed onto the surface of the conductive carbon material.

In addition, the thermoplastic resin may contain one kind or two or more kinds selected from the group consisting of polyvinyl pyridine, a salen polymerized product, polypyrrole, polyvinyl pyrrole, 3-methyl polypyrrole, polyvinyl carbazole, polyamide, polyaniline, polybismaleimide, and polyamideimide. Further, the conductive carbon material may include carbon black. Further, the metal may include a transition metal. Thus, a carbon catalyst having an excellent activity can be effectively manufactured.

In addition, the method of manufacturing a carbon catalyst may further include the steps of: subjecting the carbon catalyst obtained by the carbonization to a treatment for removing the metal; and subjecting the carbon catalyst subjected to the treatment to a heat treatment to improve an activity of the carbon catalyst. Further, in this case, the heat treatment may be performed by heating the carbon catalyst at a temperature in a range of 300 to 1,500° C. Thus, a carbon catalyst having an additionally high activity can be manufactured.

A carbon catalyst according to one embodiment of the present invention for solving the above-mentioned problems is characterized by being manufactured by any one of the above-mentioned methods. According to the present invention, there can be provided a carbon catalyst having an excellent activity.

BRIEF DESCRIPTION OF THE DRAWINGS

FIG. 2 is an explanatory diagram illustrating a relationship between a voltage and a current measured for the carbon catalyst according to one embodiment of the present invention.

FIG. 3 is an explanatory diagram illustrating an example of the results of the evaluation of the carbon catalyst according to one embodiment of the present invention for its oxygen reduction activity.

FIG. 4 is an explanatory diagram illustrating another example of the results of the evaluation of the carbon catalyst according to one embodiment of the present invention for its oxygen reduction activity.

FIG. 5 is an explanatory diagram illustrating still another example of the results of the evaluation of the carbon catalyst according to one embodiment of the present invention for its oxygen reduction activity.

FIG. 8 is an explanatory diagram illustrating another example of the results of the analysis of the carbon catalyst according to one embodiment of the present invention for the distribution of the crystallite sizes La.

FIG. 9 is an explanatory diagram illustrating a ratio of each range of the crystallite sizes La in the distribution of the crystallite sizes La obtained for the carbon catalyst according to one embodiment of the present invention.

BEST MODE FOR CARRYING OUT THE INVENTION

Hereinafter, one embodiment of the present invention is described. It should be noted that the present invention is not limited to any example described in this embodiment.

Figure 1:
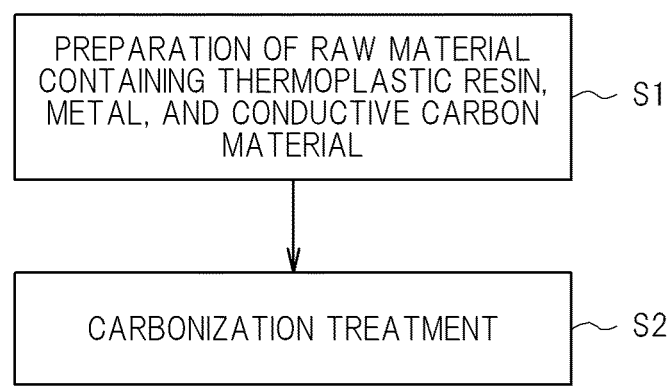
FIG. 1 is an explanatory diagram illustrating main steps in an example of a method of manufacturing a carbon catalyst according to one embodiment of the present invention.

FIG. 1 is an explanatory diagram illustrating main steps in an example of a method of manufacturing a carbon catalyst according to this embodiment (hereinafter referred to as "Manufacturing Method"). As illustrated in FIG. 1, the Manufacturing Method includes a raw material preparing step S1 and a carbonizing step S2.

In the raw material-preparing step S1, a raw material containing a thermoplastic resin, a metal, and a conductive carbon material is prepared. The thermoplastic resin is not particularly limited as long as the resin can be melted by heating in the carbonizing step S2 to be described later not only to show fluidity but also to be carbonized. That is, for example, there can be used a resin having a decomposition point (thermal decomposition temperature) that is higher than the melting point of the resin, out of general-purpose plastics such as polymethacrylic acid, engineering plastics such as polyamide, super engineering plastics such as polysulfone and polyimide, and other thermoplastic resins such as an ionomer resin. One kind of those thermoplastic resins may be used alone, or two or more kinds thereof may be used in combination.

A resin whose melting point and decomposition point largely differ from each other can be preferably used as the thermoplastic resin. That is, for example, a thermoplastic resin having a decomposition point that is higher than a melting point by 50° C. or more can be preferably used. As the difference between the melting point and the decomposition point becomes larger, the reliability with which the thermoplastic resin can be melted before being carbonized in the carbonizing step S2 becomes higher.

In addition, the thermoplastic resin can be a polymer ligand that can coordinate to the metal contained in the raw material. That is, in this case, a thermoplastic resin containing one or more ligand atoms in its molecule and having thermoplasticity in a state of being coordinated to the metal is used.

Specifically, for example, there can be used a thermoplastic resin containing, as ligand atoms in its molecule, one or more of one kind, or two or more kinds, selected from the group consisting of a nitrogen atom, a phosphorous atom, an oxygen atom, and a sulfur atom. That is, for example, there can be used a thermoplastic resin containing, as ligand groups, in its molecule, one or more of one kind, or two or more kinds, selected from the group consisting of an amino group, a phosphino group, a carboxyl group, and a thiol group.

In addition, when the thermoplastic resin serving as a ligand is used, the raw material contains a complex formed as a result of the coordination of the thermoplastic resin to the metal. Therefore, the thermoplastic resin and the metal can be integrally and efficiently dispersed in the raw material.

Further, as the thermoplastic resin serving as a polymer ligand, a resin containing, as ligand atoms, one or more nitrogen atoms in its molecule can be preferably used. Specifically, for example, there can be preferably used one kind, or two or more kinds, selected from the group consisting of polyvinyl pyridine, a salen polymer, polypyrrole, polyvinyl pyrrole, 3-methyl polypyrrole, polyvinyl carbazole, polyamide, polyaniline, polybismaleimide, and polyamideimide.

In this case, the thermoplastic resin, the metal, and the nitrogen atoms can be integrally and efficiently dispersed in the raw material. In addition, the nitrogen atoms in the thermoplastic resin exert a nitrogen-doping effect in the carbon catalyst manufactured by the Manufacturing Method, and hence can improve the activity of the carbon catalyst.

In addition to such thermoplastic resin, a thermoplastic resin containing one or more nitrogen atoms in its molecule can also be preferably used. Specifically, for example, polyacrylonitrile (PAN) can be used. In this case, the thermoplastic resin and the nitrogen atoms can be integrally and efficiently dispersed in the raw material.

In addition, a resin whose molecules are not crosslinked can be preferably used as the thermoplastic resin. In this case, the thermoplastic resin can be efficiently melted and fluidized by the heating in the carbonizing step S2. In addition, the form of a mixture of the thermoplastic resin and the metal or the form of a metal complex of the thermoplastic resin is not particularly limited as long as the activity of the carbon catalyst manufactured by the Manufacturing Method is not impaired. Examples of the form include a sheet form, a fiber form, a block form, and a particle form.

The metal is not particularly limited as long as the activity of the carbon catalyst manufactured by the Manufacturing Method is not impaired. That is, for example, a transition metal can be preferably used as the metal, and a metal belonging to the fourth period of Groups 3 to 12 in the periodic table can be particularly preferably used as the metal.

One kind of those metals may be used alone, or two or more kinds thereof may be used in combination. Specifically, for example, there can be preferably used one kind, or two or more kinds, selected from the group consisting of cobalt, iron, nickel, manganese, zinc, and copper. Of those, cobalt or iron can be particularly preferably used.

In addition, the metal can be used in the form of a simple substance of the metal or a compound of the metal. For example, a metal salt, a metal hydroxide, a metal oxide, a metal nitride, a metal sulfide, a metal carbide, or a metal complex can be preferably used as the metal compound, and a metal chloride, the metal oxide, or the metal complex can be particularly preferably used as the metal compound.

A carbon material having conductivity can be used as the conductive carbon material without any particular limitation. That is, for example, a carbon material which has conductivity but has no catalytic activity by itself can be used. The shape of the conductive carbon material is not particularly limited, and for example, a particulate or fibrous material can be used.

When the fine particles of the conductive carbon material are used, the average particle diameter of the fine particles preferably falls within the range of 3 to 100 nm. In addition, the BET specific surface area of the fine particles preferably falls within the range of 100 to 2,000 $m^2/g$.

Specifically, for example, there can be preferably used, as the conductive carbon material, one kind, or two or more kinds, selected from the group consisting of carbon black, carbon nanotube, carbon nanofiber, graphite, activated carbon, glass-like carbon, carbon fiber, and fullerene. For example, Ketjen Black, Vulcan, Toka Black, or Denka Black can be used as carbon black.

In the raw material-preparing step S1, the raw material can be prepared by mixing such thermoplastic resin, metal, and conductive carbon material as described above. That is, the raw material can be, for example, a mixed powder of the metal complex of the thermoplastic resin and the fine particles of the conductive carbon material. A method of mixing the contents of the raw material is not particularly limited. That is, one kind of mixing method such as powder mixing, solvent mixing, supercritical fluid mixing, and electrolytic polymerization coating may be employed alone, or two or more kinds thereof may be employed in combination.

A blending ratio between the thermoplastic resin and the conductive carbon material in the raw material can be appropriately set to such an extent that a carbon catalyst having an activity can be manufactured. That is, for example, the content of the conductive carbon material in the raw material preferably falls within the range of 1 to 85 mass %, and more preferably falls within the range of 5 to 50 mass %. When the content of the conductive carbon material is less than 1 mass %, sufficient conductivity cannot be imparted to the carbon catalyst manufactured by the Manufacturing Method in some cases. In addition, when the content of the conductive carbon material exceeds 85 mass %, the activity of the carbon catalyst manufactured by the Manufacturing Method may reduce instead.

In addition, the raw material may contain a thermosetting resin. In this case, the raw material contains, for example, a thermoplastic composition containing the thermoplastic resin and the thermosetting resin. The thermosetting resin is not particularly limited as long as the resin can be carbonized by the heating in the carbonizing step S2.

Specifically, for example, there can be preferably used, as the thermosetting resin, one kind, or two or more kinds, selected from the group consisting of a phenol resin, a melamine resin, an epoxy resin, and a furan resin.

In the carbonizing step S2, the raw material prepared as described above is heated so that the surface of the conductive carbon material is coated with the molten thermoplastic resin and the thermoplastic resin is carbonized on the surface of the conductive carbon material. Thus, the carbon catalyst is obtained.

That is, first, the raw material is heated at such a temperature that the thermoplastic resin in the raw material melts but the thermoplastic resin does not thermally decompose (that is, a temperature equal to or higher than the melting point of the thermoplastic resin and lower than the decomposition point of the resin).

As a result of the heating, the thermoplastic resin in the raw material is melted, and then the thermoplastic resin can be made to flow along the surface of the conductive carbon material. That is, the molten thermoplastic resin can be spread so as to coat the surface of the conductive carbon material.

As a result, a ratio of a portion coated with the thermoplastic resin to the surface of the conductive carbon material increases. That is, the area of the conductive carbon material coated with the thermoplastic resin can be increased.

Thus, part or the entirety of the surface of the conductive carbon material can be coated with the molten thermoplastic resin. That is, the thermoplastic resin can be widely dispersed and held on the surface of the conductive carbon material.

Next, further heating is performed so that the raw material may be held at such a predetermined temperature that the thermoplastic resin in the raw material can be carbonized (carbonization temperature). The heating can carbonize the thermoplastic resin in a state in which the surface of the conductive carbon material is coated with the resin.

As a result, a thin film-like carbon structure along the surface of the conductive carbon material can be formed on the surface. That is, the surface of the conductive carbon material can be effectively coated with the carbon structure.

The carbonization temperature is not particularly limited, and can be appropriately set depending on conditions such as the melting point and decomposition point of the thermoplastic resin. That is, for example, the carbonization temperature can be set to fall within the range of 300 to 1,500° C., can be preferably set to fall within the range of 500 to 1,200° C., can be more preferably set to fall within the range of 600 to 1,200° C., and can be particularly preferably set to fall within the range of 700 to 1,200° C.

In addition, a rate of temperature increase can be set to fall within the range of 0.5 to 300° C./min. In addition, for example, the time period for which the raw material is held at the above-mentioned carbonization temperature can be set to fall within the range of 5 to 180 minutes, and can be preferably set to fall within the range of 20 to 120 minutes. When the holding time is less than 5 minutes, the resin cannot be uniformly carbonized in some cases. In addition, when the holding time exceeds 180 minutes, the catalytic activity may significantly reduce owing to the disappearance of an edge surface of a carbon network plane. In addition, the carbonization treatment is preferably performed in a stream of an inert gas such as nitrogen.

It should be noted that when the raw material contains the thermoplastic resin that has formed a complex with the metal, the raw material is heated at such a temperature that the complex melts but does not decompose so that the surface of the conductive carbon material is coated with the complex, and further, the complex is held at the carbonization temperature for a predetermined time period so that the complex is carbonized on the surface.

In addition, when the raw material contains a thermosetting resin, the raw material is heated at such a temperature that a thermoplastic composition containing the thermosetting resin and the thermoplastic resin melts but does not decompose, so that the surface of the conductive carbon material is coated with the thermoplastic composition, and further, the thermoplastic composition is held at the carbonization temperature for a predetermined time period so that the thermoplastic composition is carbonized on the surface.

In the carbonizing step S2, a carbon catalyst having a conductive carbon material and a carbon structure coating the surface of the conductive carbon material can be obtained. It should be noted that the carbon structure includes a carbon network plane formed as a result of two-dimensional binding and spread of the hexagonal network planes of carbon. A defective portion such as an edge portion or bent portion of the carbon network plane may serve as an active site of the carbon catalyst. The carbon structure can be a structure in which a plurality of carbon network planes are laminated.

Here, one feature of the Manufacturing Method is, for example, the use of the thermoplastic resin as a carbon raw material for forming the carbon structure as well as the use of the conductive carbon material for improving the conductivity of the carbon catalyst.

That is, the inventors of the present invention have so far found that the carbonization of a thermosetting resin in the presence of a metal can result in the manufacture of a carbon catalyst having a turbostratic structure (nanoshell structure) similar to a graphite structure laminated and developed like an onion around a fine particle of the metal. In the carbon catalyst, an edge portion of a carbon network plane in the turbostratic structure or a bent portion of the carbon network plane probably serves as an active site so that the catalytic activity of the carbon material itself may be educed.

On the other hand, however, the spread of carbon network planes is suppressed as the number of edge portions or bent portions of the carbon network planes increases. As a result, the conductivity of the carbon catalyst reduces. In view of the foregoing, the inventors of the present invention have factored in the use of the conductive carbon material for improving the conductivity of the carbon catalyst.

However, when a thermosetting resin is used as a carbon raw material, a carbon structure formed by the carbonization of the thermosetting resin and the conductive carbon material cannot be sufficiently brought into contact with each other. That is, for example, when a raw material obtained by mixing the thermosetting resin and the fine particles of the conductive carbon material such as carbon black is carbonized, the thermosetting resin is carbonized as it is in a state of being separated from the fine particles.

Accordingly, merely a composition in which, for example, the fine particles of the conductive carbon material and particles formed of a carbide derived from the thermosetting resin are mixed is obtained. Therefore, sufficient contact between an active site of the carbon structure and the conductive carbon material cannot be achieved.

In contrast, in the Manufacturing Method, the thermoplastic resin is used as a carbon raw material. Accordingly, as described above, the thermoplastic resin is melted in the carbonization process, and as a result, a layer of the thermoplastic resin that coats the surface of the conductive carbon material can be formed. Then, the thermoplastic resin layer that coats the surface of the conductive carbon material is carbonized as it is, and as a result, the carbon structure along the surface of the conductive carbon material can be formed.

Thus, in the carbon catalyst manufactured by the Manufacturing Method, the conductive carbon material and an active site of the carbon structure can be sufficiently brought into contact with each other over a wide range of the surface of the conductive carbon material. Therefore, the carbon catalyst can exert a high catalytic activity based on a synergistic effect between the activity of the carbon structure and the conductivity of the conductive carbon material.

In addition, the fact that the area of the conductive carbon material coated with the thermoplastic resin increases in the carbonization process means that the thermoplastic resin is widely dispersed onto the surface of the conductive carbon material. Then, the thermoplastic resin widely dispersed onto the surface of the conductive carbon material is carbonized on the surface, and as a result, the carbon structure widely dispersed onto the surface can be formed. Therefore, a carbon catalyst in which the active sites of the carbon structure are widely and uniformly dispersed can be manufactured by effectively utilizing the surface of the conductive carbon material.

In addition, when the thermoplastic resin forms a complex with the metal, the metal can be widely dispersed onto the surface of the conductive carbon material in the carbonization process. Therefore, an action of the metal effective in forming the carbon structure can be uniformly exerted over a wide range of the surface of the conductive carbon material.

Further, when the thermoplastic resin contains nitrogen atoms as ligand atoms in its molecules, the nitrogen atoms can be introduced while being widely dispersed in the carbon structure. Therefore, a nitrogen-doping effect can be uniformly exerted over a wide range of the surface of the conductive carbon material.

In addition, in the process of carbonizing the thermoplastic resin on the surface of the conductive carbon material, the volume of the thermoplastic resin constricts in association with the progress of the carbonization. Accordingly, a thin film-like carbon structure along the surface of the conductive carbon material is formed on the surface, and the structure of the conductive carbon material is maintained. Therefore, according to the Manufacturing Method, a carbon catalyst that takes advantage of characteristics intrinsic to the conductive carbon material can be obtained.

As described above, according to the Manufacturing Method, a carbon catalyst excellent in conductivity and in a catalytic activity such as an oxygen reduction activity can be manufactured.

In addition, the Manufacturing Method can further include a metal-removing step involving subjecting the carbon catalyst obtained in the above-mentioned carbonizing step S2 to a treatment for removing the metal. The metal-removing treatment can remove the metal in the carbon catalyst or reduce the content of the metal in the carbon catalyst.

A method of removing the metal is not particularly limited. That is, for example, a washing treatment with an acid or an electrolytic treatment can be employed. When the washing with an acid is performed, boiling acid may be used. For example, hydrochloric acid can be preferably used as the acid.

In addition, the Manufacturing Method can further include a heat treatment step involving subjecting the carbon catalyst that has been subjected to the metal-removing treatment to a heat treatment to improve the activity of the carbon catalyst. In the heat treatment step, a heat treatment that heats the carbon catalyst after the metal-removing treatment is performed.

The heat treatment is performed by holding the carbon catalyst at a predetermined temperature (heat treatment temperature). For example, the heat treatment temperature can be a temperature in the range of 300 to 1,500° C., and is set to preferably 400° C. or more, more preferably 600° C. or more, particularly preferably 700° C. or more. Performing the heat treatment at 600° C. or more, or 700° C. or more can effectively improve the activity of the carbon catalyst. In addition, the heat treatment temperature is set to preferably 1,200° C. or less, and more preferably 1,000° C. or less.

The range of the heat treatment temperature can be a range obtained by arbitrarily combining those lower and upper limits. That is, for example, the heat treatment temperature can be set to fall within the range of 400 to 1,200° C., can be preferably set to fall within the range of 600 to 1,200° C., can be more preferably set to fall within the range of 700 to 1,200° C., and can be particularly preferably set to fall within the range of 700 to 1,000° C. In addition, for example, the time period for which the carbon catalyst is held at any such heat treatment temperature can be set to fall within the range of 10 minutes to 5 hours, and can be preferably set to fall within the range of 30 minutes to 2 hours. A rate of temperature increase in the heat treatment can be set to fall within the range of, for example, 0.5 to 1,000° C./rain.

As described above, the heat treatment is preferably performed at a temperature lower than a heating temperature generally adopted in the so-called graphitization treatment. That is, the heat treatment can be performed by, for example, heating the carbon catalyst at a heat treatment temperature equal to or lower than the temperature at which the raw material is heated in the carbonizing step S2 or at a heat treatment temperature lower than the temperature.

Specifically, for example, when the heating temperature in the carbonization treatment falls within the range of 600 to 1,200° C. or when the heating temperature falls within the range of 700 to 1,200° C., the heat treatment can be performed at a heat treatment temperature within the range and equal to or lower than the heating temperature or at a heat treatment temperature lower than the heating temperature.

Such heat treatment can result in effective formation of, for example, structural defects serving as active sites on the surface of the carbon catalyst. In addition, the heat treatment can remove, for example, an inert metal component remaining in a trace amount in the carbon catalyst after the metal-removing treatment. Therefore, a carbon catalyst having an additionally high activity as a result of effective exposure of the active sites can be obtained.

In addition, the Manufacturing Method can include the step of introducing (doping) nitrogen atoms or boron atoms into the carbon catalyst. A method of introducing the nitrogen atoms or boron atoms into the carbon catalyst is not particularly limited. That is, when the carbon catalyst is doped with the nitrogen atoms, for example, a vapor phase doping method such as an ammo-oxidation method or a CVD method, a liquid phase doping method, or a vapor phase-liquid phase doping method can be employed.

Specifically, for example, in the vapor phase doping method, the nitrogen atoms can be introduced into the surface of the carbon catalyst by: mixing the carbon catalyst and a nitrogen source such as ammonia, melamine, or acetonitrile; and holding the mixture under an atmosphere of an inert gas such as nitrogen, argon, or helium and air at a temperature in the range of 550 to 1,200° C. for a time period in the range of 5 to 180 minutes or treating the mixture with heat in an NOx gas. As a result of the introduction of the nitrogen atoms, the nitrogen atoms can be introduced into, for example, the hexagonal network plane structures of the carbon structure to form pyrrole-type, graphene-substituted, pyridine-type, pyridone-type, or oxidized structures.

A carbon catalyst according to this embodiment (hereinafter referred to as "Catalyst") is a carbon catalyst manufactured by providing a carbon material itself with a catalytic activity, and can be efficiently manufactured by the Manufacturing Method described above.

The Catalyst is a carbon catalyst having a conductive carbon material and a carbon structure coating the surface of the conductive carbon material. The carbon structure is, for example, a carbon structure formed by heating a raw material containing a thermoplastic resin, a metal, and the conductive carbon material to carbonize the raw material as described above. In addition, the carbon structure is formed so as to include carbon network planes in which defective portions such as edge portions and bent portions are formed as active sites.

In the Catalyst, the carbon structure can be formed into a film shape along the surface of the conductive carbon material. Specifically, for example, when the conductive carbon material is fine particles of carbon black or the like, the carbon structure is formed so as to coat the surface of each of the fine particles in the Catalyst. Such a coating-like carbon structure can be efficiently and reliably formed by the Manufacturing Method as described above. As described above, the Catalyst has a conductive carbon material portion as the so-called carrier (base material) and a carbon structure portion (carbonized layer) including active sites, the carbon structure portion being formed on the surface of the conductive carbon material.

In addition, the Catalyst can be formed while containing the conductive carbon material maintaining its intrinsic carbon structure. That is, as described above, in the carbonization process of the Manufacturing Method, the thermoplastic resin that has coated the surface of the conductive carbon material is carbonized while its volume is reduced. As a result, a carbon structure thinner than the layer of the thermoplastic resin that has coated the surface of the conductive carbon material is formed on the surface, and the structure of the conductive carbon material remains nearly unchanged. Therefore, the Catalyst can be a carbon catalyst that takes advantage of characteristics intrinsic to the conductive carbon material.

In addition, the carbon structure of the Catalyst can be formed of, for example, one to five layers of carbon network planes laminated on the surface of the conductive carbon material. The carbon structure can be formed of one to four layers of carbon network planes, can be formed of one to three layers of carbon network planes, or can be formed of one or two layers of carbon network planes. The number of carbon network planes laminated in the carbon structure can be calculated from, for example, a crystallite size Lc in the direction (c-axis direction) in which the carbon network planes are laminated, the size being obtained on the basis of the results of X-ray diffraction measurement. When the carbon structure is formed into such a thin film shape, the external appearance of the Catalyst resembles the external appearance of the conductive carbon material itself on which the carbon structure is not formed.

It should be noted that, for example, when a composite material is manufactured by mixing the powder of the conductive carbon material and the powder of the carbon catalyst prepared separately from, and independently of, each other, it becomes difficult to form an interface at which a nano-level active site of the carbon catalyst and the conductive carbon material satisfactorily contact each other. Therefore, such composite material cannot be a high-performance catalyst material.

In contrast, in the Catalyst, an interface at which a nano-level active site of the carbon structure and the conductive carbon material satisfactorily contact each other can be formed because the carbon structure coats the conductive carbon material. Therefore, even in the case where the conductive carbon material itself does not intrinsically have a catalytic activity, the Catalyst can have a higher activity than that in the case where the Catalyst does not contain the conductive carbon material by virtue of a synergistic effect between the carbon structure and the conductive carbon material.

The Catalyst has, for example, an oxygen reduction activity as a catalytic activity. That is, the Catalyst can effectively catalyze, for example, an oxygen reduction reaction in an electrode for a fuel cell.

The Catalyst can be evaluated for its oxygen reduction activity in terms of, for example, an oxygen reduction-starting potential. That is, the oxygen reduction-starting potential of the Catalyst can be set to fall within the range of, for example, 0.7 V or more versus a normal hydrogen electrode (vs. NHE) and 1.2 V or less vs. NHE when the evaluation is performed by regarding the potential as the voltage at which a reduction current of −10 μA/cm$^2$ flows. In addition, for example, the oxygen reduction-starting potential can be set to 0.75 V or more, can be preferably set to 0.76 V or more, and can be more preferably set to 0.77 V or more.

It should be noted that the oxygen reduction-starting potential can be determined on the basis of, for example, data showing a relationship between the voltage and a current obtained by sweeping and applying a potential with a rotating ring-disk electrode apparatus having a working electrode wherein the Catalyst has been coated.

In addition, the Catalyst can be evaluated for its catalytic activity in terms of, for example, the number of electrons involved in an oxygen reduction reaction. In an oxygen reduction reaction catalyzed by the Catalyst, the number of electrons involved in the reaction is calculated as the number of electrons involved in the reduction reaction per molecule of oxygen.

That is, for example, in a reaction where water is produced from protons and oxygen in the cathode electrode (air electrode) of a fuel cell, four electrons are theoretically involved in a reduction reaction for one molecule of oxygen. In actuality, however, a reaction in which hydrogen peroxide is produced as a result of the involvement of two electrons in a reduction reaction for one molecule of oxygen also occurs in parallel.

Therefore, it can be said that in the oxygen reduction reaction of the cathode electrode, the number of electrons involved in a reduction reaction for one molecule of oxygen is preferably as close to four as possible because an additionally large quantity of current can be obtained, the generation of hydrogen peroxide can be suppressed, and an environmental load can be reduced.

In this regard, according to the Catalyst, the number of electrons involved in the oxygen reduction reaction can be set to fall within the range of 3.5 to 4, can be preferably set to 3.6 or more, and can be more preferably set to 3.8 or more.

In addition, the Catalyst can have a characteristic distribution of crystallite sizes La of the carbon network planes of which its carbon structure is formed. It should be noted that the term "crystallite size La" refers to the spread of a carbon network plane in an a-axis direction.

That is, the carbon structure of the Catalyst can be formed of a carbon network plane in which a ratio of crystallite sizes of 1 to 5 nm in a distribution of crystallite sizes La of 7.2 nm or less is 50% or more. In addition, in this case, a ratio of crystallite sizes of less than 1 nm can be set to 40% or less. Further, the ratio of the crystallite sizes of 1 to 5 nm can be preferably set to 60% or more. In addition, the ratio of the crystallite sizes of less than 1 nm can be preferably set to 30% or less, and can be more preferably set to 20% or less. The ratio of the crystallite sizes of 1 to 5 nm and the ratio of the crystallite sizes of less than 1 nm in the distribution of the crystallite sizes La can be obtained by arbitrarily combining the above-mentioned ranges.

Further, the carbon structure of the Catalyst can be formed of a carbon network plane in which a ratio of crystallite sizes of 2 to 5 nm in the distribution of the crystallite sizes La of 7.2 nm or less is 20% or more, preferably 30% or more. In addition, in this case, a ratio of crystallite sizes of less than 2 nm can be set to 60% or less. The ratio of the crystallite sizes of 2 to 5 nm and the ratio of the crystallite sizes of less than 2 nm in the distribution of the crystallite sizes La can be obtained by arbitrarily combining the above-mentioned ranges.

In addition, performing a heat treatment can set the ratio of the crystallite sizes of 2 to 5 nm to 80% or more. Further, in this case, the ratio of the crystallite sizes of less than 2 nm can be set to 15% or less, can be preferably set to 10% or less, and can be more preferably set to 5% or less. The ratio of the crystallite sizes of 2 to 5 nm and the ratio of the crystallite sizes of less than 2 nm in the distribution of the crystallite sizes La can be obtained by arbitrarily combining the above-mentioned ranges.

In addition, performing a heat treatment can set the ratio of the crystallite sizes of 3 to 5 nm to 50% or more, preferably 60% or more, more preferably 70% or more. Further, in this case, the ratio of the crystallite sizes of less than 3 nm can be set to 50% or less, can be preferably set to 40% or less, can be more preferably set to 30% or less, and can be particularly preferably set to 20% or less. The ratio of the crystallite sizes of 3 to 5 nm and the ratio of the crystallite sizes of less than 3 nm in the distribution of the crystallite sizes La can be obtained by arbitrarily combining the above-mentioned ranges.

In addition, the ratio of the crystallite sizes of more than 5 nm can be set to 60% or less, can be preferably set to 40% or less, and can be more preferably set to 20% or less. The ratio of the crystallite sizes of 5 nm or less and the ratio of the crystallite sizes of more than 5 nm in the distribution of the crystallite sizes La can be obtained by arbitrarily combining the above-mentioned ranges.

Such distribution of the crystallite sizes La can be determined by, for example, Diamond's method on the basis of the results of X-ray diffraction measurement. The Diamond's method is a method proposed by Diamond in 1956 for the evaluation of carbon network planes in a sample having a relatively small network plane size such as coal or pitch for their average size and distribution (see, for example, R. Diamond, Ph. D. Dissertation, University of Cambridge, England, 1956, R. Diamond, Acta. Cryst. 10 (1957) 359-363., R. Diamond, Acta. Cryst. 11 (1958) 129-138., and R. Diamond, Phil. Trans. Roy. Soc. London A252 (1960) 193-223.). Specifically, the method is a method of evaluating, under the assumption that a carbon sample whose structure is unknown is an aggregate of several kinds of model carbon network planes whose structures are known, the distribution of network plane sizes, the method involving: representing a measured eleven-band intensity in an X-ray diffraction profile obtained for the sample as the sum of the products of the theoretical X-ray scattering intensities of predetermined model network planes and weight fractions; and determining the respective weight fractions by the least-square method (see, for example, Hiroyuki FUJIMOTO, Carbon, 228 (2007) 185-194.).

An electrode according to this embodiment (hereinafter referred to as "Electrode") is an electrode that carries the Catalyst described above. That is, the Electrode can be formed so as to have a predetermined electrode base material and the Catalyst carried on the electrode base material.

The Electrode can be, for example, an electrode for a fuel cell. More specifically, the Electrode can be, for example, an electrode for a polymer electrolyte fuel cell (PEFC). That is, in this case, the Catalyst can be an electrode catalyst for a fuel cell, can be preferably an electrode catalyst for a PEFC, and can be particularly preferably a cathode electrode catalyst for a PEFC.

A fuel cell according to this embodiment (hereinafter referred to as "Fuel Cell") is a fuel cell having the above-mentioned Electrode. For example, the Fuel Cell can be preferably a PEFC as described above.

More specifically, for example, when the Fuel Cell is a PEFC, the Fuel Cell can have a membrane-electrode assembly (MEA) in which a polymer electrolyte membrane, and a cathode electrode (positive electrode, air electrode) and an anode electrode (negative electrode, fuel electrode) formed on one side, and the other side, of the polymer electrolyte membrane, are respectively integrated, and the cathode electrode can carry the Catalyst.

Next, specific examples according to this embodiment are described.

Example 1

After 1.5 g of vinyl pyridine had been dissolved in 20 mL of dimethylformamide, polymerization was performed at 70° C. over 5 days. Thus, polyvinyl pyridine was obtained. 0.65 Gram of iron chloride hexahydrate was added to the polyvinyl pyridine, and then the mixture was stirred at room temperature for 24 hours. Thus, a polyvinyl pyridine iron complex was obtained.

Ketjen black (EC600JD, Lion Corporation) was added to the complex, and then the contents were mixed with a mortar. Thus, a raw material containing the polyvinyl pyridine iron complex and the ketjen black, and containing the ketjen black at 50 wt %, was obtained.

In addition, a raw material containing a cobalt complex of the polyvinyl pyridine and the ketjen black, and containing the ketjen black at 50 wt %, was obtained by using cobalt chloride hexahydrate instead of the above-mentioned iron chloride hexahydrate.

Next, those raw materials were each subjected to a carbonization treatment. That is, first, the raw materials prepared as described above were each loaded into a quartz tube. Next, the quartz tube was placed in an ellipsoidal reflection-type infrared gold image furnace, and then nitrogen purge was performed for 20 minutes.

Then, heating was started, and the temperature of the gold image furnace was increased from room temperature to 800° C. under a nitrogen atmosphere over 1.5 hours. After that, the quartz tube was held at 800° C. for 1 hour. A composition containing a carbon catalyst was obtained by such carbonization treatment.

Further, the composition thus obtained was pulverized with a planetary ball mill (P-7, Fritsch Japan Co., Ltd.) in which silicon nitride balls each having a diameter of 1.5 mm had been set at a rotational speed of 800 rpm for 60 minutes. The pulverized composition was taken out, and the fine particles of the carbon catalyst that had passed a sieve having an aperture of 105 μm were recovered.

Further, the carbon catalyst obtained as described above was subjected to an acid washing treatment for removing a metal. That is, 37% HCl was added to the carbon catalyst, and then the mixture was stirred for 2 hours. After that, the mixture was left at rest, and then the supernatant was decanted. The foregoing operation was performed three times. Further, suction filtration was performed, and then washing with distilled water was performed. Next, boiling was performed. Thus, two kinds of carbon catalysts (a PVP/Fe/KB catalyst and a PVP/Co/KB catalyst) each subjected to a metal-removing treatment were obtained.

In addition, part of the PVP/Fe/KB catalyst obtained as described above was subjected to a heat treatment. That is, the PVP/Fe/KB catalyst was loaded into a quartz tube, and then the quartz tube was placed in an ellipsoidal reflection-type infrared gold image furnace.

Then, the quartz tube was held in the infrared gold image furnace under a nitrogen atmosphere at 400° C., 700° C., or 1,000° C. for 1 hour. Thus, three kinds of carbon catalysts (a PVP/Fe/KB (H400) catalyst, a PVP/Fe/KB (H700) catalyst, and a PVP/Fe/KB (H1000) catalyst) subjected to heat treatments at three different temperatures were obtained.

Example 2

10 Grams of 8-quinolinol (oxine), 10 g of formaldehyde, and 1 g of oxalic acid dihydrate were loaded into an eggplant flask having a volume of 100 mL, and then the mixture was refluxed at 100° C. overnight. Next, 5.5 mL of 1-M HCl were added to the resultant, and then the mixture was similarly refluxed overnight. The resultant solid was subjected to suction filtration, washed with distilled water three times, and dried in a vacuum overnight. Thus, a polymer (Q polymer) was obtained.

Meanwhile, 8-quinolinol and phenol were mixed at such a ratio that the molar fraction of phenol in a polymer to be obtained was 70%. The resultant mixture was loaded into a 100-mL eggplant flask in such an amount that the total amount of 8-quinolinol and phenol was 0.1 mol. Further, 0.1 mol of formaldehyde was added to the mixture, and then the contents were uniformly mixed while the eggplant flask was warmed with a hot water bath at 100° C. One gram of oxalic acid dihydrate was loaded into the eggplant flask, and then the whole was refluxed at 100° C. overnight. Further, 5.5 ml, of 1-M HCl were added to the resultant, and then the mixture was similarly refluxed overnight. The resultant composition was subjected to suction filtration, washed with distilled water three times, and dried in a vacuum overnight. Thus, a polymer (Q-Ph polymer) was obtained.

3.3 Grams of each of the two kinds of polymers thus obtained were taken and dissolved in 100 mL of DMF. A solution prepared by dissolving 2.7 g of cobalt(II) chloride in 50 mL of DMF was added to the resultant solution, and then the mixed solution was left at rest overnight. The mixed solution was dried in a vacuum with an evaporator (90° C.) overnight. The resultant composition was washed in a Soxhlet extractor with ethanol for one day, and further, was dried in a vacuum overnight. Thus, two kinds of polymer cobalt complexes (a Q/Co complex and a Q-Ph/Co complex) were obtained.

Ketjen black (EC600JD, Lion Corporation) was added to each of the two kinds of polymer cobalt complexes thus obtained, and then the contents were mixed with a mortar. Thus, two kinds of raw materials each containing the Q/Co complex or the Q-Ph/Co complex, and the ketjen black, and containing the ketjen black at 50 wt %, were obtained.

Each of the two kinds of raw materials thus prepared was heated with an infrared image furnace under a nitrogen atmosphere to 1,000° C. at a rate of temperature increase of 10° C./min, and was then carbonized by being held at 1,000° C. for 1 hour. The resultant composition was ground with a mortar, and then fine particles each having a particle diameter of 106 µm or less that had passed a sieve having an aperture of 106 µm were recovered as a carbon catalyst.

Further, the carbon catalyst obtained as described above was subjected to an acid washing treatment for removing cobalt. That is, 37% HCl was added to the carbon catalyst, and then the mixture was stirred for 2 hours. After that, the mixture was left at rest, and then the supernatant was decanted. The foregoing operation was performed three times. Further, after suction filtration was performed on the carbon catalyst, washing with distilled water was performed, and then boiling was performed. Thus, two kinds of carbon catalysts (a Q/Co/KB catalyst and a Q-Ph/Co/KB catalyst) each subjected to a metal-removing treatment were obtained.

Example 3

3.275 Grams of a phenol resin (Gun Ei Chemical Industry Co., Ltd.) were added to 300 mL of acetone, and were then dissolved by being irradiated with an ultrasonic wave. Further, 1.0 g of a cobalt phthalocyanine complex (TOKYO CHEMICAL INDUSTRY CO., LTD.) was added to the solution, and then the solvent was removed with a rotary evaporator at 40° C. while an ultrasonic wave was applied. After that, the remaining composition was dried in a vacuum at a temperature of 80° C. for 24 hours. Thus, a cobalt phthalocyanine complex containing a phenol resin was synthesized.

The cobalt phthalocyanine complex thus prepared was loaded into a quartz tube, and then nitrogen gas purge was conducted on the quartz tube for 20 minutes in an ellipsoidal reflection-type infrared gold image furnace. Then, heating was started, and the temperature of the gold image furnace was increased from room temperature to 800° C. at a rate of temperature increase of 10° C./min. After that, the quartz tube was held at 800° C. for 1 hour. A carbon catalyst was obtained by such carbonization treatment.

Further, the carbon catalyst thus obtained was subjected to an acid washing treatment for removing cobalt. That is, 37% HCl was added to the carbon catalyst, and then the mixture was stirred for 2 hours. After that, the mixture was left at rest, and then the supernatant was decanted. The foregoing operation was performed three times. Further, after suction filtration was performed on the carbon catalyst, washing with distilled water was performed, and then boiling was performed. Thus, a carbon catalyst (a Pc/Co catalyst) subjected to a metal-removing treatment was obtained.

In addition, part of the Pc/Co catalyst thus obtained was subjected to a heat treatment. That is, the Pc/Co catalyst was loaded into a quartz tube, and then the quartz tube was placed in an ellipsoidal reflection-type infrared gold image furnace. Then, the quartz tube was held in the infrared gold image furnace under a nitrogen atmosphere at 400° C., 700° C., or 1,000° C. for 1 hour. Thus, three kinds of carbon catalysts (a Pc/Co (H400) catalyst, a Pc/Co (H700) catalyst, and a Pc/Co (H1000) catalyst) subjected to heat treatments at three different temperatures were obtained.

Example 4

The five kinds of carbon catalysts obtained in Example 1, the two kinds of carbon catalysts obtained in Example 2, and the four kinds of carbon catalysts obtained in Example 3 were each evaluated for their oxygen reduction activity. That is, first, 5 mg of a powdery carbon catalyst were weighed, and then 50 µL of a binder solution (Nafion (registered trademark), Du Pont Co., Ltd.), 150 µL of water, and 150 µL of ethanol were added in appropriate amounts to the carbon catalyst. The mixed solution was prepared as catalyst slurry.

Next, a trace amount of the catalyst slurry was sucked with a pipette, and was then coated on a disk electrode (having a diameter of 5 mm) of a rotating ring-disk electrode apparatus (RRDE-1 SC-5, Nikko Keisoku Co., Ltd.), followed by drying. Thus, a working electrode was manufactured. A platinum electrode was used as a ring electrode. A solution prepared by dissolving oxygen in a 1-M aqueous solution of sulfuric acid at normal temperature was used as an electrolyte solution.

The electrodes were rotated at a rotational speed of 1,500 rpm, and a current when a potential was swept at a sweep rate of 0.5 mV/sec was recorded as a function of the potential. In addition, the voltage at which a reduction current of −10 µA/cm$^2$ flowed in the resultant polarization curve was recorded as an oxygen reduction-starting potential. A current density when a voltage of 0.7 V was applied was also recorded. Further, the number n of electrons involved in a reaction was calculated from the following equation (I). In the equation (I), $I_D$ and $I_R$ represent a disk current and a ring current at a potential of 0 V, respectively, and N represents a capture ratio, which was set to 0.372256.

$$n = \frac{4I_D}{I_D + \frac{I_R}{N}} \quad (I)$$

FIG. 2 illustrates an example of a relationship between a voltage and a current density obtained by a rotating ring-disk electrode method. FIG. 2(A) illustrates the results for the four kinds of Pc/Co catalysts, and FIG. 2(B) illustrates the results for the four kinds of PVP/Fe/KB catalysts, the Q/Co/KB catalyst, and the Q-Ph/Co/KB catalyst. In FIG. 2, the axis of abscissa indicates a voltage (V vs. NHE) and the axis of ordinate indicates a current density (mA/cm$^2$) at each voltage. It should be noted that in FIG. 2, a carbon catalyst enabling the flow of a larger current at a higher voltage means that the catalyst has higher performance. In addition, FIG. 3 illustrates an example of the results of the evaluation of each of the carbon catalysts for its current density (mA/cm$^2$) when a voltage of 0.7 V was applied, oxygen reduction-starting potential (V), and number of electrons involved in a reaction.

As illustrated in FIGS. 2 and 3, the five kinds of carbon catalysts each manufactured by using a raw material containing an iron complex or cobalt complex of polyvinyl pyridine and ketjen black each had a higher oxygen reduction activity than that of any other carbon catalyst.

Further, the three kinds of carbon catalysts each subjected to a heat treatment (PVP/Fe/KB (H400), PVP/Fe/KB (H700), and PVP/Fe/KB (H1000)) out of the five kinds of carbon catalysts were each found to have a higher oxygen reduction activity than that of each of the remaining two kinds of carbon catalysts not subjected to any heat treatment (PVP/Fe/KB (N) and PVP/Co/KB).

That is, for example, the carbon catalysts each subjected to a heat treatment at 700° C. or 1,000° C. (PVP/Fe/KB (H700) and PVP/Fe/KB (H1000)) each showed an increase in current density by a factor of around 2.5 compared with that of the carbon catalyst not subjected to any heat treatment (PVP/Fe/KB (N)).

It was thought that performing a heat treatment at 700° C. or more was able to effectively burn off, for example, a functional group on the surface of a carbon catalyst, and as a result, a reaction field that could cause an oxygen reduction reaction was efficiently formed at an edge portion of a carbon network plane.

Example 5

A raw material containing a polyvinyl pyridine iron complex and ketjen black, and containing the ketjen black at 50 wt %, was obtained in the same manner as in Example 1 described above. Then, in the same manner as in Example 1 described above, the temperature of the raw material was increased by heating, and then the raw material was held under a nitrogen atmosphere at 500° C., 600° C., 700° C., 800° C., 900° C., or 1,000° C. for 1 hour.

Further, in the same manner as in Example 1 described above, the compositions thus obtained were pulverized and sieved, followed by a metal-removing treatment. Thus, six kinds of carbon catalysts subjected to carbonization treatments at different temperatures (PVP/Fe/KB (C500), PVP/Fe/KB (C600), PVP/Fe/KB (C700), PVP/Fe/KB (C800), PVP/Fe/KB (C900), and PVP/Fe/KB (C1000)) were obtained.

In addition, in the same manner as in Example 1 described above, part of the four kinds of carbon catalysts manufactured at carbonization temperatures of 700° C. to 1,000° C. were each subjected to a heat treatment. A heating temperature in the heat treatment was set to 700° C. Then, each of the carbon catalysts was evaluated for its oxygen reduction activity in the same manner as in Example 4 described above.

FIG. 4 illustrates an example of the results of the evaluation of each of the four kinds of carbon catalysts, each of which was manufactured at a carbonization temperature of 700° C. to 1,000° C. but was not subjected to any heat treatment, and the four kinds of catalysts, each of which was manufactured at a carbonization temperature of 700° C. to 1,000° C. and subjected to a heat treatment for its oxygen reduction-starting potential (V) and number of electrons involved in a reaction. As illustrated in FIG. 4, subjecting a carbon catalyst to a heat treatment unproved the oxygen reduction activity of the carbon catalyst.

Example 6

Two kinds of carbon catalysts each carbonized at 800° C. or 1,000° C. (a Pc/Co (C800) catalyst and a Pc/Co (C1000) catalyst) were obtained in the same manner as in Example 3 described above. In addition, similarly, a carbon catalyst carbonized at 800° C. (Pc/Fe (C800) catalyst) was obtained by using an iron phthalocyanine complex instead of the cobalt phthalocyanine complex. Then, each of the carbon catalysts was evaluated for its oxygen reduction activity in the same manner as in Example 4 described above.

FIG. 5 illustrates an example of the results of the evaluation of each of the carbon catalysts for its current density (mA/cm$^2$) when a voltage of 0.7 V was applied and oxygen reduction-starting potential (V). As illustrated in FIG. 5, it was confirmed that each of the carbon catalysts had an oxygen reduction activity.

Example 7

The eight kinds of carbon catalysts out of the carbon catalysts obtained in Example 5 described above, the ketjen black used in the manufacture of each of the carbon catalysts, and the three kinds of carbon catalysts obtained in Example 6 were each evaluated for the distribution of their crystallite sizes La.

A carbon catalyst sample was placed in a concave portion of a glass sample plate, and at the same time, was pressed with a slide glass. Thus, the sample was uniformly loaded into the concave portion so that its surface and a reference surface might coincide with each other. Next, the glass sample plate was fixed on a wide-angle X-ray diffraction sample base so that the morphology of the loaded carbon catalyst sample might not collapse.

Then, X-ray diffraction measurement was performed with an X-ray diffraction apparatus (Rigaku RINT2100/PC, Rigaku Corporation). A voltage and a current applied to an X-ray tube were set to 32 kV and 20 mA, respectively. A sampling interval, a scanning rate, and a measurement angle range (2θ) were set to 0.1°, 0.1°/min, and 5 to 100°, respectively. CuKα was used as an incident X-ray.

First, the powder X-ray diffraction pattern of each sample was measured. Then, a diffraction peak was measured, and integration was performed four times. Thus, data to be analyzed was obtained. Next, the average of the network plane sizes, and distribution of the sizes, of carbon were analyzed by employing Diamond's method. Analytical software (Carbon Analyzer D series, Hiroyuki FUJIMOTO, http://www.asahi-net.or.jp/~qn6h-fjmt/) installed in a computer was used in the analysis. The data to be analyzed was limited to the eleven-band intensity of a carbonaceous material measured with a CuKα ray as an X-ray source by using a counter graphite monochrometer. In addition, the maximum network plane size that could be analyzed was about 7 nm.

Here, the procedure of the analysis method proposed by Diamond is basically formed of the following six steps: (1) the measurement of the eleven-band intensity of a sample; (2) the correction of the measured intensity; (3) the assumption of model network planes expected to exist in the sample; (4) the calculation of theoretical scattering intensities from the assumed model network planes; (5) the least-square fitting of the determined measured intensity with the theoretical scattering intensities; and (6) the calculation of the weight fractions of the model network planes and an average network plane size from the weights of the respective theoretical scattering intensities. In view of the foregoing, first, the data to be analyzed was read, and was subjected to a smoothing treatment and absorption correction. The smoothing treatment was performed seven times, and the absorption correction was performed with a theoretical absorption coefficient of 4.219.

Next, the theoretical scattering intensities were calculated. The following equation (II) was used as a calculation equation. In the equation (II), I represents the measured intensity, w represents a mass fraction, B represents a theoretical X-ray scattering intensity, P represents a polarization factor, and v and s each represent a network plane model factor.

$$I_{OBS} = \sum_{i=1}^{n} w_i B_i(s) + B^{-CH2-}(s) + B^{-CH3}(s) + \\ B^{-NH2}(s) + B^{>C=O}(s) + B^{-O-}(s) + \sum P_r(s) + v(s) \quad (II)$$

Here, all parameters can each be represented as a function of n (see Hiroyuki FUJIMOTO, Carbon, 192 (2000) 125-129). The calculation of the theoretical scattering intensities requires the determination of a two-dimensional lattice constant $a_0$ and a Ruland coefficient, and the selection of the model network planes as the setting of initial conditions. The two-dimensional lattice constant is generally set to a value between the lattice constants of benzene and ideal graphite, i.e., about 0.240 to 0.24612 nm. The Ruland coefficient represents the integration width of a function showing the pass band of the energy of the monochrometer used, and generally takes a value of 0 to 1.

In this analysis, 0.24412 nm, a value close to the lattice constant of a general carbonaceous material, was selected as the initially set value of the lattice constant $a_0$, and 0.05 was selected as the initially set value of the Ruland coefficient.

Figure 6:
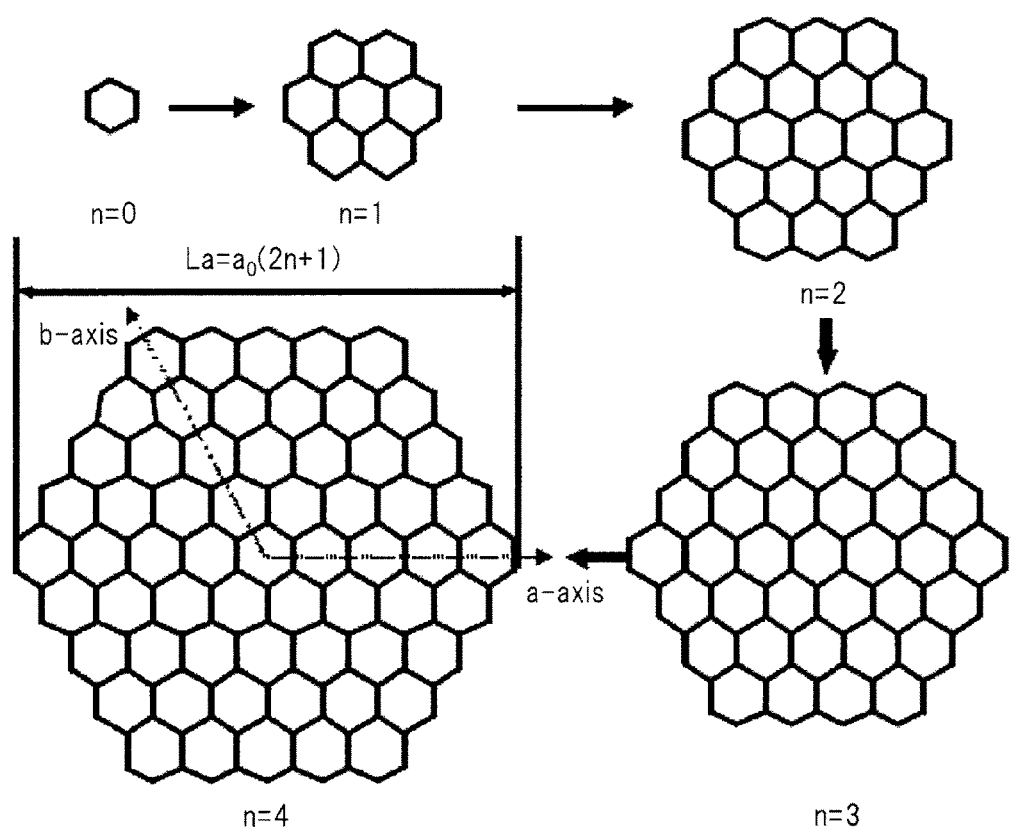
FIG. 6 is an explanatory diagram for a benzene-coronene base model used in the analysis of the carbon catalyst according to one embodiment of the present invention for the distribution of the crystallite sizes La.

Next, the model network planes were selected. The above-mentioned software can execute the calculation of a theoretical intensity with three kinds of model network planes, i.e., a benzene-coronene base model, a pyrene base model, and a mixed model. In contrast, a benzene-coronene base model such as illustrated in FIG. 6 was used in this analysis. In the case of the model, the scattering intensity of a model network plane having a size of an odd-number multiple (×1, 3, 5, . . . , 25, 27, or 29) of the two-dimensional lattice constant $a_0$ (that is, the size is about 0.25 nm to 7 nm) can be calculated.

Thus, all selection conditions were determined, and then the theoretical scattering intensities were calculated. After the completion of the calculation, repeated calculation according to the least-square method based on the following equation (III) was performed 1,000 times. Then, a measured profile and a theoretical profile were fitted with each other with a fitting angle range 2θ set to 60 to 100°. After the completion of the fitting, the display of the computer displayed a fitting result, a network plane size distribution, and an average network plane size. Thus, the ratios (%) of crystallite sizes of 0.245 nm, 0.736 nm, 1.223 nm, 1.719 nm, 2.210 nm, 2.700 nm, 3.200 nm, 3.683 nm, 4.174 nm, 4.665 nm, 5.156 nm, 5.647 nm, 6.138 nm, 6.630 nm, and 7.110 nm were obtained as the distribution of the crystallite sizes La of 7.2 nm or less.

$$|R = \frac{\sum_{S}\left|I_{OS} - \sum_{i}\lambda_i B_{is}\right|}{\sum_{S}I_{OS}} \times 100 \quad (III)$$

Figure 7:
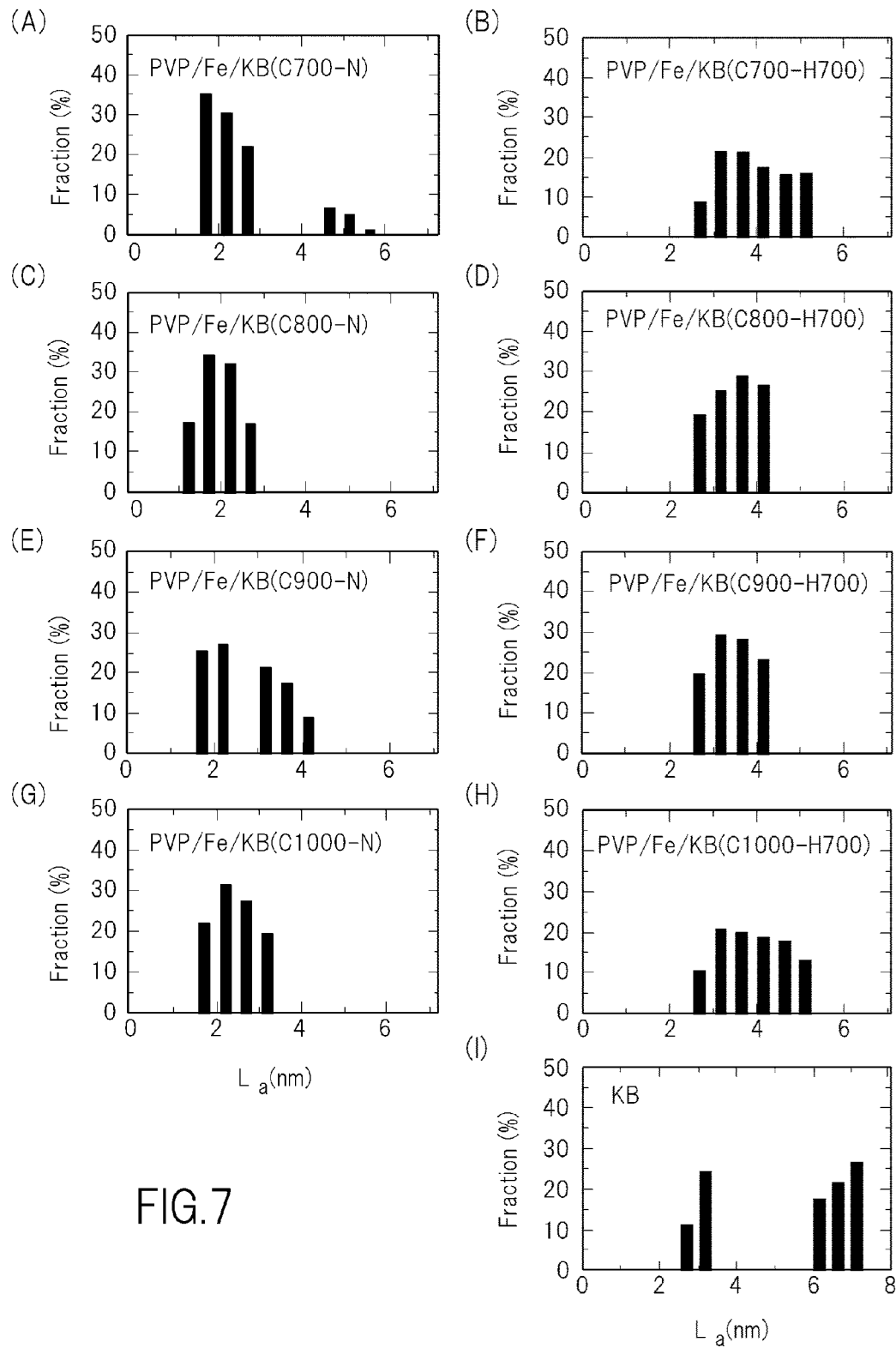
FIG. 7 is an explanatory diagram illustrating an example of the results of the analysis of the carbon catalyst according to one embodiment of the present invention for the distribution of the crystallite sizes La.

FIG. 7 illustrates an example of the distribution of the crystallite sizes La obtained for each of the eight kinds of carbon catalysts manufactured at carbonization temperatures of 700 to 1,000° C. in Example 5 described above and the ketjen black used in the manufacture of each of the carbon catalysts. FIGS. 7(A), 7(C), 7(E), and 7(G) illustrate the results of the carbon catalysts which were manufactured at carbonization temperatures of 700° C., 800° C., 900° C., and 1,000° C. but were not subjected to any heat treatment, respectively. FIGS. 7(B), 7(D), 7(F), and 7(H) illustrate the results of the carbon catalysts which were manufactured at carbonization temperatures of 700° C., 800° C., 900° C., and 1,000° C. and subjected to a heat treatment at 700° C., respectively. FIG. 7(I) represents the results of the ketjen black.

In addition, FIG. 8 illustrates an example of the distribution of the crystallite sizes La obtained for each of the three kinds of carbon catalysts obtained in Example 6 described above. FIGS. 8(A), 8(B), and 8(C) illustrate the results of the Pc/Co (C800) catalyst, the Pc/Co (C1000) catalyst, and the Pc/Fe (C800) catalyst not subjected to any heat treatment, respectively. In addition, FIG. 9 illustrates the ratio (%) of the crystallite sizes La in each range in the distribution of the crystallite sizes La obtained for each of the thirteen kinds of carbon catalysts and the ketjen black serving as the objects of the analysis.

As illustrated in FIGS. 7 to 9, the ten kinds of carbon catalysts (PVP/Fe/KB) manufactured by using raw materials each containing the polyvinyl pyridine, iron, and the ketjen black each had a distribution of the crystallite sizes La with a trend different from that of any other carbon catalyst.

That is, for example, the ratio of the crystallite sizes La in the range of 1 to 5 nm was as high as 60 to 100%, and the ratio of the crystallite sizes in the range of 2 to 5 nm was also as high as 30 to 100%. In particular, when the heat treatment was performed, the ratio of the crystallite sizes La in the range of 1 to 5 nm was as high as 80 to 100%, and the ratio of the crystallite sizes in the range of 2 to 5 nm was also as high as 80 to 100%. On the other hand, the ratio of the crystallite sizes of less than 1 nm and the ratio of the crystallite sizes in excess of 5 nm were each as low as 20% or less.

A specific distribution of the crystallite sizes La obtained by a combination of such thermoplastic resin (polyvinyl pyridine) and conductive carbon material (ketjen black) was considered to be related to such oxygen reduction activity as illustrated in FIG. 3 of Example 4 described above.

In addition, the PVP/Fe/KB catalysts subjected to the heat treatment each had a distribution of the crystallite sizes La different from that of each of the PVP/Fe/KB catalysts not subjected to any heat treatment. That is, for example, the PVP/Fe/KB catalysts subjected to the heat treatment each had a specific distribution of the crystallite sizes La in which the ratio of the crystallite sizes La in the range of 2 to 5 nm was as high as 80 to 100% and the ratio of the crystallite sizes of less than 2 nm was as low as 10% or less. Further, the PVP/Fe/KB catalysts subjected to the heat treatment each had a specific distribution of the crystallite sizes La in which the ratio of the crystallite sizes La in the range of 3 to 5 nm was as high as 70% or more and the ratio of the crystallite sizes of less than 3 nm was as low as 20% or less.

Such change of the distribution of the crystallite sizes La of a carbon catalyst depending on the presence or absence of a heat treatment was considered to be related to such improvement in an oxygen reduction activity by the heat treatment as illustrated in FIG. 3 of Example 4 described above.

Example 8

The PVP/Fe/KB catalysts, each of which had been manufactured in Example 1 described above but had not been subjected to any heat treatment, the Q/Co/KB catalysts manufactured in Example 2, and the ketjen black used in the manufacture of each of these catalysts, were each observed with an electron microscope.

Figure 10:
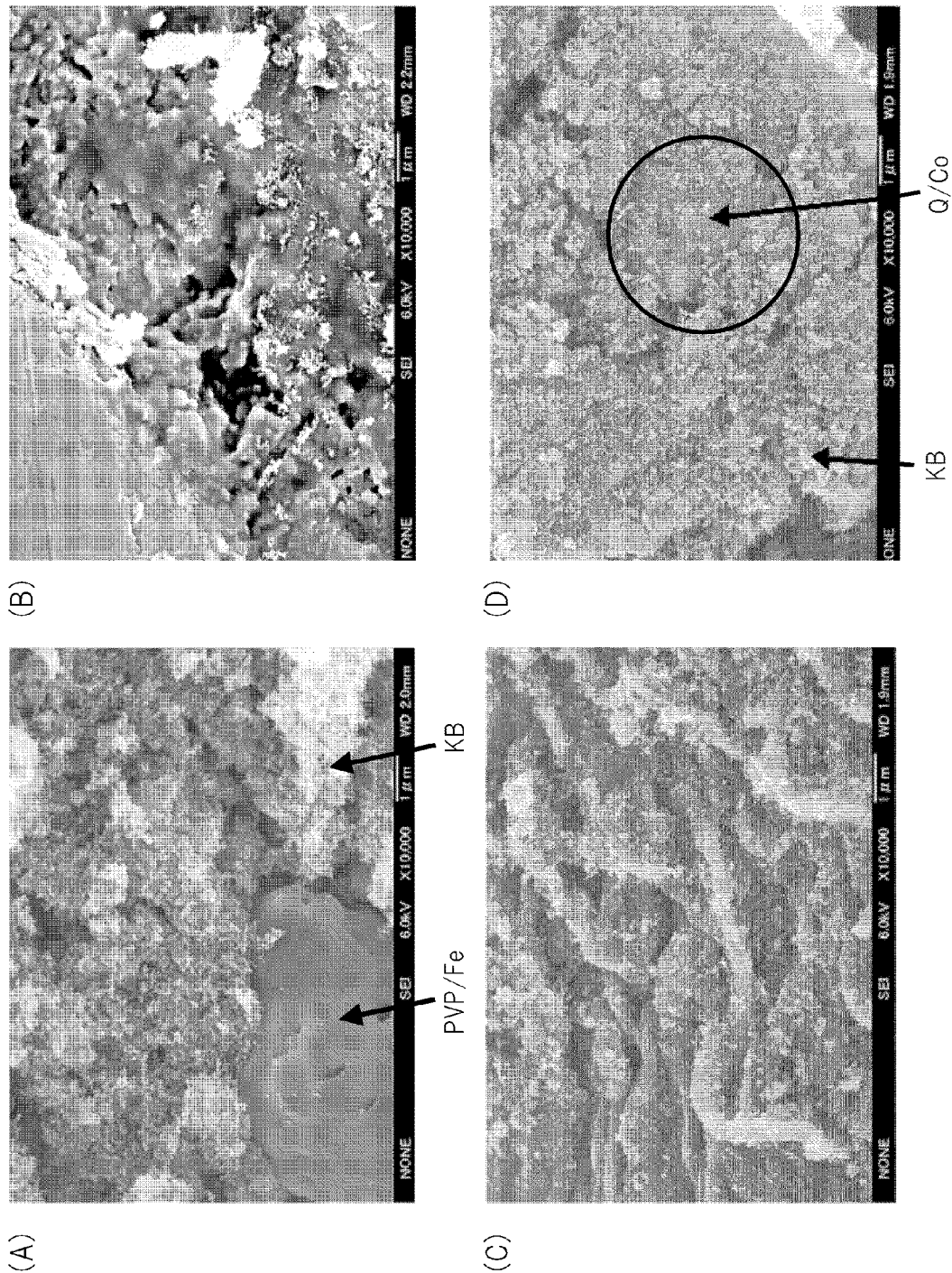
FIG. 10 is an explanatory diagram illustrating an example of a scanning electron microscope photograph of the carbon catalyst according to one embodiment of the present invention.

FIG. 10 illustrates an example of a photograph taken with a scanning electron microscope (SEM). FIG. 10(A) is an SEM photograph for a raw material as a mixture of an iron complex of polyvinyl pyridine and ketjen black, FIG. 10(B) is an SEM photograph for the raw material heated to 300° C., FIG. 10(C) is an SEM photograph for a PVP/Fe/KB catalyst after carbonization, and FIG. 10(D) is an SEM photograph for a Q/Co/KB catalyst.

As illustrated in FIG. 10(A), the iron complex of the polyvinyl pyridine ("PVP/Fe" in the figure) and the ketjen black ("KB" in the figure) were present in a state of being separated from each other in the raw material for the PVP/Fe/KB catalyst.

In contrast, as illustrated in FIG. 10(B), when the raw material was heated to 300° C. close to the decomposition point of the polyvinyl pyridine, the polyvinyl pyridine melted in the raw material to coat the surface of the ketjen black.

Then, as illustrated in FIG. 10(C), in the PVP/Fe/KB catalyst obtained by carbonizing the raw material, the surface of the ketjen black was coated with a thin film-like carbon structure formed by carbonizing the polyvinyl pyridine iron complex layer.

In the PVP/Fe/KB catalyst, the structure of the ketjen black was retained. In addition, the ketjen black maintaining its structure and the coating of the carbon structure contacted each other in a wide range along the surface of the ketjen black.

That is, a nano-level adhesive interface was satisfactorily formed between the ketjen black and the carbon structure, probably as a result of the constriction of the polyvinyl pyridine iron complex in association with its carbonization after the complex had coated the surface of the ketjen black.

In addition, lamination distribution analysis performed by Hirsch's method on the basis of the results of X-ray diffraction measurement suggested that about three layers of small crystallites were formed in the PVP/Fe/KB catalyst.

It should be noted that the Hirsch's method is a method proposed by Hirsch in 1954 for the evaluation of carbon network planes in a sample having a relatively small network plane size, such as coal or pitch, for their average lamination number and lamination distribution.

As the ketjen black typically had about two layers of carbon network planes, a carbon structure formed of about one to two layers of carbon network planes was considered to be formed on the surface of the ketjen black. In addition, a thin film of such carbon structure was considered to form an active site of a catalyst.

In contrast, as illustrated in FIG. 10(D), in the Q/Co/KB catalyst, a carbide ("Q/Co" in the figure) formed by the carbonization of a cobalt complex of a thermosetting 8-quinolinol polymer existed while being separated from the ketjen black ("KB" in the figure).

That is, the Q/Co/KB catalyst was formed by the adhesion of an aggregate of the carbide to the surface of the ketjen black. Therefore, it was confirmed that significantly satisfactory contact between the ketjen black and the carbon structure was achieved in the PVP/Fe/KB catalyst compared with the Q/Co/KB catalyst.

Figure 11:
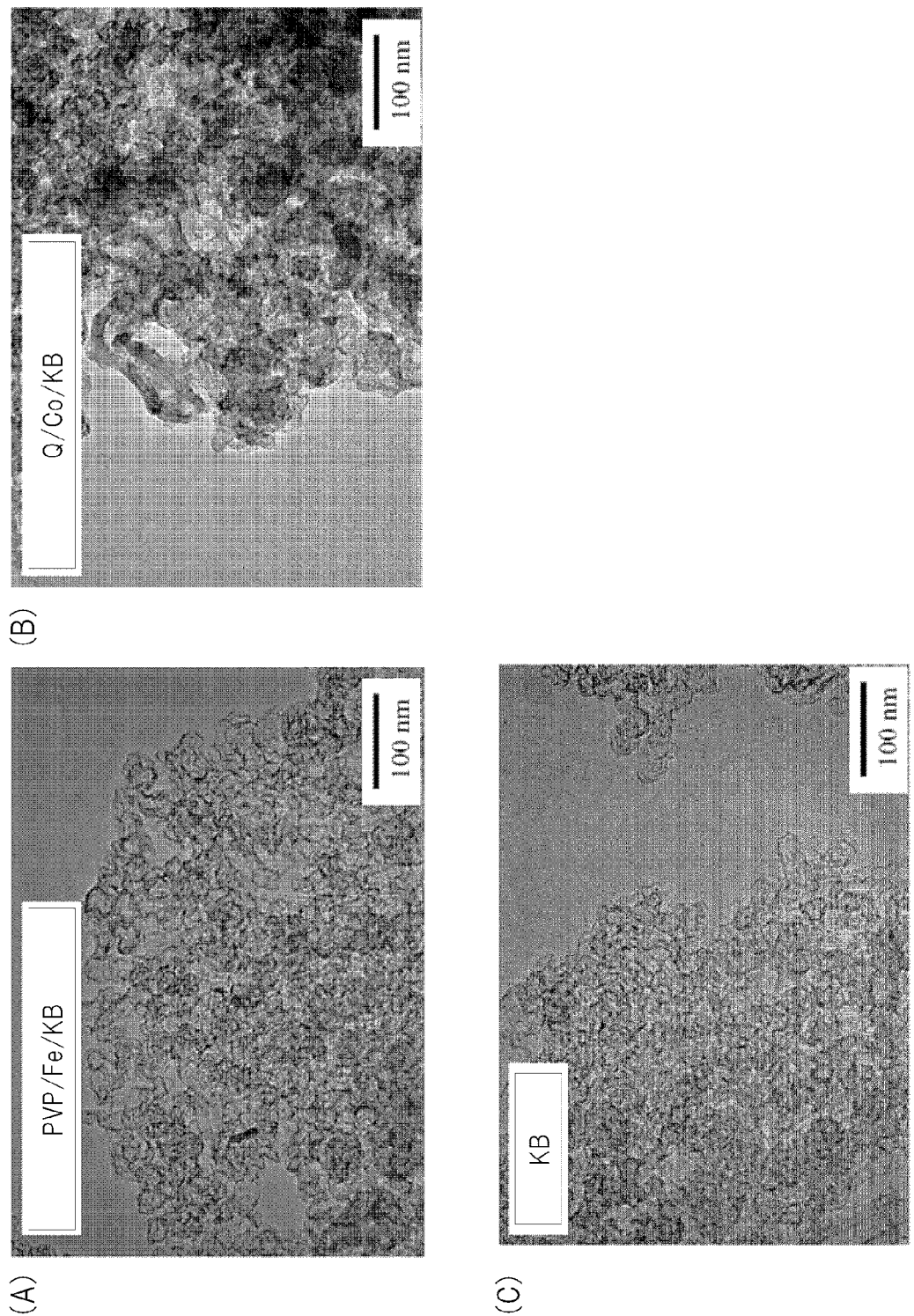
FIG. 11 is an explanatory diagram illustrating an example of a transmission electron microscope photograph of the carbon catalyst according to one embodiment of the present invention.

In addition, FIG. 11 illustrates an example of a photograph taken with a transmission electron microscope (TEM). FIG. 11(A) is a TEM photograph for a PVP/Fe/KB catalyst, FIG. 11(B) is a TEM photograph for a Q/Co/KB catalyst, and FIG. 11(C) is a TEM photograph for ketjen black alone.

As illustrated in FIGS. 11(A) and 11(C), it was confirmed that a structure intrinsic to the ketjen black was maintained in the PVP/Fe/KB catalyst. That is, the PVP/Fe/KB catalyst was considered to have an extremely thin carbon structure for coating the surface of the ketjen black.

On the other hand, as illustrated in FIGS. 11(B) and 11(C), the structure intrinsic to the ketjen black could no longer be observed in the Q/Co/KB catalyst. Accordingly, an aggregate of the carbide is considered to coexists with the ketjen black so that they overlap each other.

The invention claimed is:

1. A carbon catalyst, comprising:
   a conductive carbon material; and
   a carbon structure coating a surface of the conductive carbon material, wherein the carbon structure is formed of a carbon network plane in which a ratio of crystallite plane sizes of 3 to 5 nm in a distribution of crystallite plane sizes La of 7.2 nm or less is 60% or more; wherein more than one crystallite plane size is comprised in the distribution of crystallite plane sizes La of 7.2 nm or less.

2. The carbon catalyst according to claim 1, wherein the carbon structure is formed of a carbon network plane in which a ratio of crystallite plane sizes of 1 to 5 nm in the distribution of crystallite plane sizes La of 7.2 nm or less is 80% or more.

3. The carbon catalyst according to claim 2, wherein a ratio of crystallite plane sizes of less than 1 nm in the distribution of the crystallite plane sizes La of 7.2 nm or less is 20% or less.

4. The carbon catalyst according to claim 1, wherein the carbon structure comprises a carbon structure formed by heating a raw material containing a thermoplastic resin, a metal, and the conductive carbon material to carbonize the raw material.

5. An electrode for a fuel cell that carries the carbon catalyst according to claim 1.

6. A fuel cell comprising the electrode according to claim 5.

7. A method of manufacturing a carbon catalyst of claim 1, the method comprising the step of heating a raw material containing a thermoplastic resin, a metal, and a conductive carbon material to coat a surface of the conductive carbon material with the molten thermoplastic resin and to carbonize the thermoplastic resin on the surface of the conductive carbon material so that the carbon catalyst is obtained,
   the carbon catalyst comprising: the conductive carbon material; and
   a carbon structure coating the surface of the conductive carbon material, wherein the carbon structure is formed of a carbon network plane in which a ratio of crystallite plane sizes of 3 to 5 nm in a distribution of crystallite plane sizes La of 7.2 nm or less is 60% or more;

wherein more than one crystallite plane size is comprised in the distribution of crystallite plane sizes La of 7.2 nm less.

8. The method of manufacturing a carbon catalyst according to claim 7, wherein:
   the thermoplastic resin comprises a polymer ligand capable of coordinating to the metal; and
   the raw material contains a complex formed as a result of coordination of the thermoplastic resin to the metal.

9. The method of manufacturing a carbon catalyst according to claim 8, wherein the thermoplastic resin contains one or more nitrogen atoms as ligand atoms in a molecule thereof.

10. The method of manufacturing a carbon catalyst according to claim 9, wherein the thermoplastic resin contains one kind, or two or more kinds, selected from the group consisting of polyvinyl pyridine, a salen polymerized product, polypyrrole, polyvinyl pyrrole, 3-methyl polypyrrole, polyvinyl carbazole, polyamide, polyaniline, polybismaleimide, and polyamideimide.

11. The method of manufacturing a carbon catalyst according to claim 7, wherein the conductive carbon material comprises carbon black.

12. The method of manufacturing a carbon catalyst according to claim 7, wherein the metal comprises a transition metal.

13. The method of manufacturing a carbon catalyst according to claim 7, further comprising the steps of:
   subjecting the carbon catalyst obtained by the carbonization to a treatment for removing the metal; and
   subjecting the carbon catalyst that has been subjected to the treatment to a heat treatment to improve an activity of the carbon catalyst.

14. The method of manufacturing a carbon catalyst according to claim 13, wherein the heat treatment is performed by heating the carbon catalyst at a temperature in a range of 300 to 1,500° C.

15. A carbon catalyst, comprising:
   a conductive carbon material; and
   a carbon structure coating a surface of the conductive carbon material, wherein the carbon structure is formed of a carbon network plane in which a ratio of crystallite plane sizes of 3 to 5 nm in a polydisperse distribution of crystallite plane sizes La of 7.2 nm or less is 60% or more.

16. The carbon catalyst according to claim 15, wherein the carbon structure is formed of a carbon network plane in which a ratio of crystallite plane sizes of 1 to 5 nm in the polydisperse distribution of crystallite plane sizes La of 7.2 nm or less is 80% or more.

17. The carbon catalyst according to claim 16, wherein a ratio of crystallite plane sizes of less than 1 nm in the polydisperse distribution of the crystallite plane sizes La of 7.2 nm or less is 20% or less.

18. The carbon catalyst according to claim 15, wherein the carbon structure comprises a carbon structure formed by heating a raw material containing a thermoplastic resin, a metal, and the conductive carbon material to carbonize the raw material.

19. An electrode for a fuel cell that carries the carbon catalyst according to claim 15.

20. A fuel cell comprising the electrode according to claim 19.

* * * * *